United States Patent [19]
White et al.

[11] Patent Number: 5,402,340
[45] Date of Patent: Mar. 28, 1995

[54] GRADIOMETER BASED TERRAIN ESTIMATION

[75] Inventors: John S. White, Tonawanda; Albert Jircitano, Grand Island, both of N.Y.

[73] Assignee: Textron, Inc., Providence, R.I.

[21] Appl. No.: 236,955

[22] Filed: May 2, 1994

[51] Int. Cl.$^6$ .............................................. G06F 19/00
[52] U.S. Cl. .................................. 364/420; 364/454; 73/382 G
[58] Field of Search ..................... 364/420, 453, 454; 73/382 G

[56] References Cited

U.S. PATENT DOCUMENTS

| | | | |
|---|---|---|---|
| 3,747,403 | 7/1973 | Yungul | 73/151 |
| 4,168,524 | 9/1979 | Soltz et al. | 364/454 |
| 4,173,784 | 11/1979 | Heath et al. | 364/453 |
| 5,339,684 | 8/1994 | Jircitano et al. | 364/454 |
| 5,349,530 | 9/1994 | Odagawa | 364/454 |
| 5,359,889 | 11/1994 | Jircitano et al. | 73/178 R |

*Primary Examiner*—Donald E. McElheny, Jr.
*Attorney, Agent, or Firm*—Perman & Green

[57] ABSTRACT

A terrain estimation system and procedure in which prior knowledge of terrain configuration is taken as a starting point in the estimation procedure. The gravity field of the earth is sensed by a gradiometer which measures the gravity gradient as the gradiometer is transported by a moving platform past the earth's surface to obtain data of the topology of the earth's surface and of the geology of the terrain including subterranean oil and iron deposits. Optimal filter means, operative in response to a statistical model of terrain and residual geology predict values of gravity gradient to be sensed by said gradiometer at successive locations along a path of travel. Comparison is made between measured and predicted values of gravity gradient to update terrain altitude data by nulling a difference between measured values and predicted values of gravity gradient. Terrain surface is represented by the sum of a finite series of shells developed as cross covariance terms in a statistical mathematical model of terrain and residual geology. Each shell has a three-dimensional surface. A point on the surface of a shell is described by three parameters, namely the height of the point above a reference surface, north slope and east slope. A summation of shells of differing spatial frequency, such as a series of approximately one half dozen shells, provides for a smooth surface which represents the terrain at each of many points on the earth's surface.

17 Claims, 12 Drawing Sheets

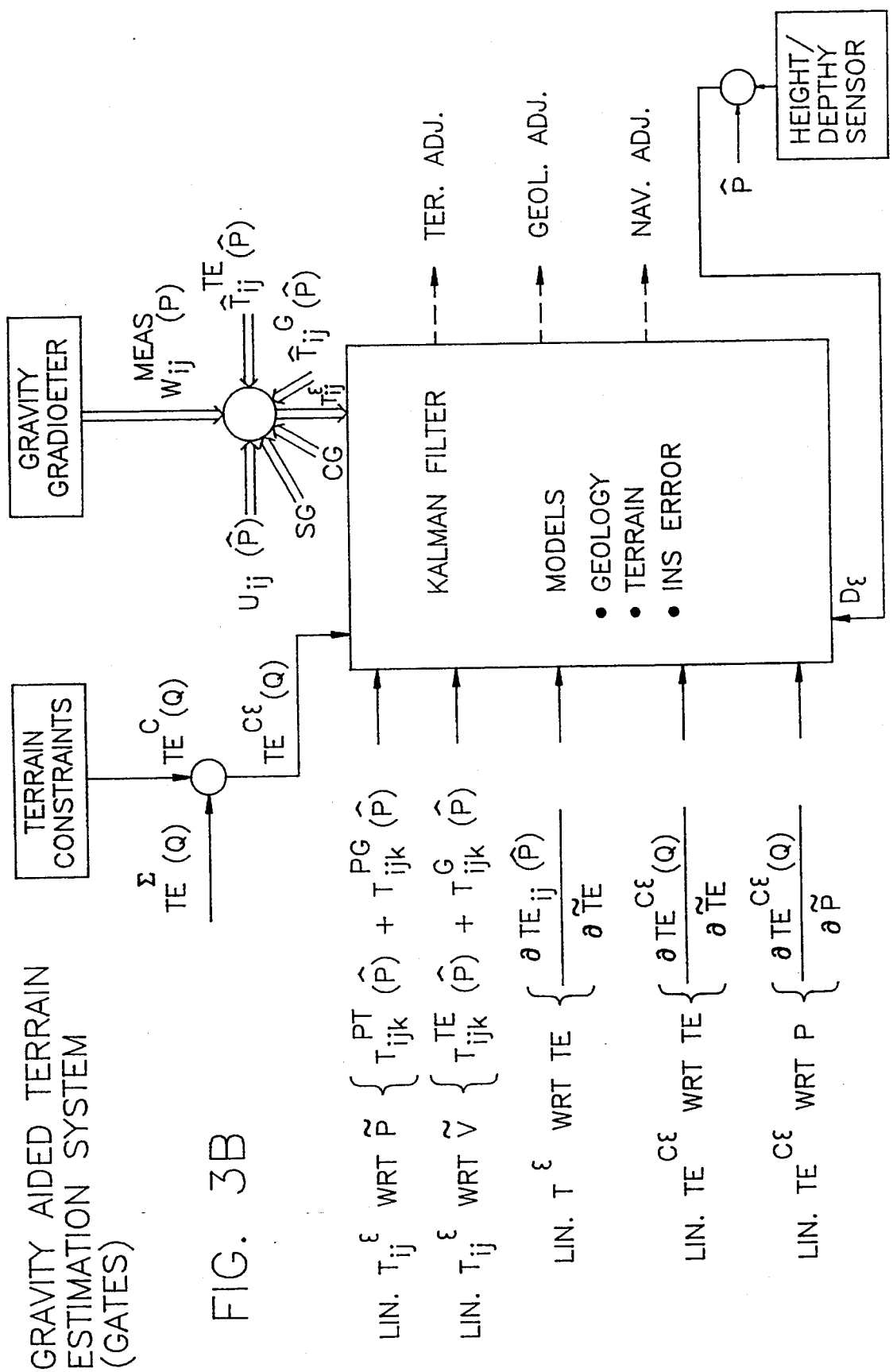

GRADIOMETER BASED TERRAIN ESTIMATION

BACKGROUND OF THE INVENTION

This invention relates to terrain estimation useful in the provision of a map of altitude of the earth's surface versus position along the earth's surface and, more particularly, to the formation of a terrain estimate based on a succession of measurements of the gravity gradient by a gradiometer, the measurements being conducted in conjunction with inertial navigation which locates the gradiometer.

Various techniques for mapping the earth's terrain are presently available, such as the use of side-looking radar, radar-height finding, and photography at visible and infrared regions of the spectrum, by way of example. Such techniques are dependent on the reception of radiant energy from the terrain being mapped. In the case of the radar mapping, the process includes the transmission of a radar beam to illuminate the terrain being mapped.

A problem arises in that the foregoing techniques are disadvantageous in that only certain features can be mapped, as distinguished from anomalies such as oil fields or iron deposits located beneath the earth's surface. Also, the foregoing techniques may require the transmission of radiation, a disadvantage if covert operation is preferred, as well as the reception of radiation, a disadvantage in the presence of adverse atmospheric conditions.

SUMMARY OF THE INVENTION

The aforementioned problem is overcome and other advantages are provided, in accordance with the invention, by a terrain estimation system and procedure in which prior knowledge of terrain configuration, which may be no more than an assumption of a smooth uniform terrain configuration or a rough estimate provided by a topographical map, is taken as a starting point in the estimation procedure. The gravity field of the earth is sensed by a gradiometer which measures the gravity gradient as the gradiometer is transported by a moving platform above the earth's surface, such as by an aircraft, or by a submarine in the case of measurement of the terrain of the ocean bottom. During the transport of the gradiometer, accurate information as to the location of the gradiometer is provided by means of an inertial navigation system (INS) and for by use of a global positioning system (GPS) employing satellite data. The use of the gradiometer provides data not only of the topology of the earth's surface, but also data of the geology of the terrain including subterranean oil and iron deposits.

In accordance with the practice of the invention, a portion of the terrain surface is represented by the sum of a finite series of component surfaces, to be referred to as shells, in a manner somewhat analogous to the use of a truncated Fourier series to represent a desired waveform or shape of a physical object. The shells are developed as cross covariance terms in a statistical mathematical model of terrain and residual geology. A point on the surface of a shell is described by three parameters, namely the height of the point above a reference surface, the slope of the shell at the point as measured in a north-south vertical plane and designated herein as the north slope, and the slope of the shell at the point as measured in an east-west vertical plane designated herein as the east slope. In the case of a flat surface, the north and the east slopes are equal to zero. The reference surface is taken as a locally flat region which is an approximation to a smooth spherical surface centered about the center of the earth. The shells vary in their horizontal extent to provide for different spatial frequencies. By analogy with the aforementioned Fourier series, a relatively sharp peaked shell is analogous to a pulse of a relatively high spatial frequency Fourier term while a relatively broad peaked shell is analogous to a pulse of a relatively low spatial frequency Fourier term. For convenience in nomenclature, the terms high spatial frequency and low spatial frequency may be employed to characterize various ones of the shells. A summation of shells of differing spatial frequency, such as a series of approximately one half dozen shells, provides for a smooth surface which represents the terrain at each of many points on the earth's surface.

The use of the foregoing truncated series of shells to represent terrain reduces the complexity and number of computer calculations employed in the practice of the invention. Further reduction in the complexity and number of calculations is attained by representing each shell by a limited number of grid points, such as a rectangular or square array of nine grid points arranged in a matrix or grid of three columns by three rows. Each shell has a surface extending in three dimensional space. Some of the shells have the form of a hill with a rounded top, and making a smooth transition into sloping sides. Or a shell may have the form of a depression (a mathematically negative hill) with a rounded bottom, and making a smooth transition into sloping sides. Other ones of the shells include a depression positioned on one side of the hill. Unlike the terms of a Fourier series, there is no requirement that any one of the present shells have symmetry; for example, a hill or a depression may have steep slopes at one edge point of the grid and gentle slopes at a diametrically opposite point of the grid. The use of a wide variety of shell shapes enables the invention to accurately represent a terrain surface with relatively few shells, for example, five to eight shells, with six shells being employed in a preferred embodiment of the invention.

Alternatively, a grid may be constructed as a larger matrix of four columns by four rows, or five columns by five rows may be employed for increased accuracy in the terrain estimation. However, in the preferred embodiment of the invention, the use of the smaller grid of nine points has proven to be more beneficial in terms of allowing for the real-time computation of the earth's terrain during transport of the gradiometer by an aircraft. Prior to inception of the gradiometer measurements, the system of shells and their grid points are established throughout the region of the earth's surface to be mapped. In the usual situation, prior topographical data is available from a topographical map and, accordingly, the set of shells shows a predominance of high-frequency shells in regions of rough or mountainous terrain while a predominance of low-frequency shells predominates in regions which are characterized by generally flat or rolling plains. As further convenience in the processing of data, in the practice of the invention, the summation of the shells is used to represent the difference in altitude provided by a prior terrain map and a calculated best estimate of the altitude. The magnitude of this differential altitude, or altitude error, serves as a basis for correcting the prior terrain map.

By virtue of the shape of each shell, namely, in the form of a hill having a peak, or hill and nearby depression, in the central portion of the shell, the major contribution to the surface produced by summation of the shells comes from the central portion of each shell. Distant shells produce a relatively small contribution to the surface at a measurement point. This is consonant with decreased sensitivity of the gradiometer to geographical features at great distances from the measuring point. Preferably, the gradiometer is a three-axis gradiometer having accelerometers rotating about three orthogonal axes to provide a full set of terms for the gradient tensor. During transport of the gradiometer above the earth's surface, the gradiometer passes by the locations of the grid points describing a succession of highest-frequency shells, as well as the grid points describing the successions of lower and lowest frequency shells. The matrix of grid points describing each shell is located at a central region of the corresponding shell. Thus, during travel of the gradiometer above the earth's surface, the gradiometer encounters central peak regions of the highest frequency shells at a relatively high rate while encountering central peak regions of the lowest-frequency shell at a relatively low rate. At each location of the gradiometer, the series of shells closest to the gradiometer, in terms of their central peak regions, are employed for estimation of the terrain.

The grid points for the respective highest frequency shells are located with uniform spacing, such as 100 meters by way of example, along the earth's surface. Thereby, as the gradiometer travels from the location of one grid point to the location of the next grid point, the gradiometer picks up the adjacent highest frequency shell and drops the previous highest frequency shell for use in computation of the estimate of the terrain surface. The next lower frequency shell has a larger grid spacing, such as a 200 meter grid spacing which is double the previous spacing by way of example. Thus, the gradiometer encounters successive ones of the next lower frequency shells at half the rate of the encountering of the highest frequency shells. The ratio of the spatial wavelengths of the shells may be a factor such as 2, 3, or 4, by way of example, the ratio of 2 being employed in the preferred embodiment of the invention.

A feature of the invention is the use of the estimated terrain surface to calculate the values of the gravity gradient tensor at successive locations, or observation points, as the vehicle carrying the gradiometer travels along a path above the earth's surface. Thereby, there are two values of gravity gradient, namely, one value which is obtained by a calculation based upon the best estimate of the earth's terrain and a second value which is obtained by measurement by the gradiometer. If the terrain estimate is correct, them the two gravity gradients are equal, and a subtraction of the two gradients, one from the other, indicates a zero error in the estimation of terrain. A non-zero error indicates that an adjustment is required in the amplitudes of the shells, the sum of which provides the estimation of terrain surface.

The calculation of gradient from the estimated terrain surface is made possible by use of a further step of the invention wherein a set of parallelpiped prisms is constructed upon the reference surface in the vicinity of the measurement point. The flat tops of the prisms intercept the estimated terrain surface to provide a step-wise approximation to the terrain surface. The bases of the prisms vary in size such that the prisms having the smallest bases are located closest to the observation point. The vertices of the prisms are employed to establish equations which are solved to obtain the gravity gradients. The foregoing process of comparing the computed gradients with the measured gradients and the adjustment of the estimated terrain surface to minimize the gradient error are repeated at successive ones of the measurement points to provide a more accurate estimate of the terrain surface as well as to indicate the presence of an anomaly which is understood to be a geologic formation. It is noted also that, in the event that the earth's terrain is known accurately, then a deviation between the computed and the measured gradients can be used as an indication of an inaccuracy by the navigational equipment which locates the vehicle carrying the gradiometer. This latter function is particularly useful for underwater vehicles which may be out of radio contact with satellite communication of a global positioning system. The repetitive process of calculating the gravity gradients and updating the terrain surface estimate as well as the description of the geological formation and the correction of navigational errors, is accomplished by Kalman filtering.

BRIEF DESCRIPTION OF THE DRAWING

The aforementioned aspects and other features of the invention are explained in the following description, taken in connection with the accompanying drawing wherein:

FIGS. 3A & 3B are diagrams of the estimation system of the invention showing a mathematical representation of signals employed in the operation of a filter for production of terrain, geologic, and navigational data in accordance with the invention;

Identically labeled elements appearing in different ones of the figures refer to the same element in the different figures.

DETAILED DESCRIPTION

Figure 1:
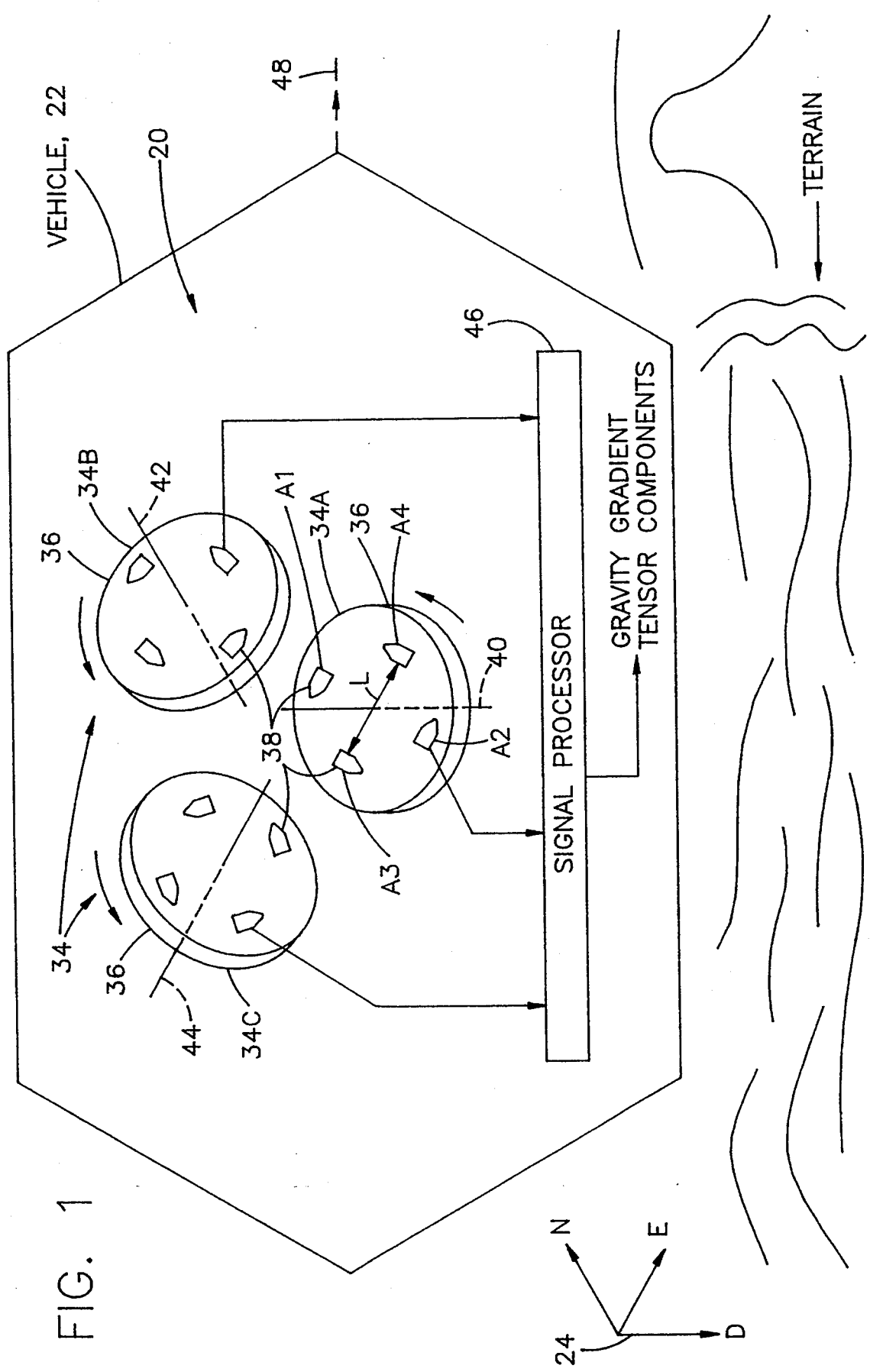
FIG. 1 is a stylized view of a vehicle carrying a three-axis gravity gradiometer above the earth's terrain.
Figure 2:
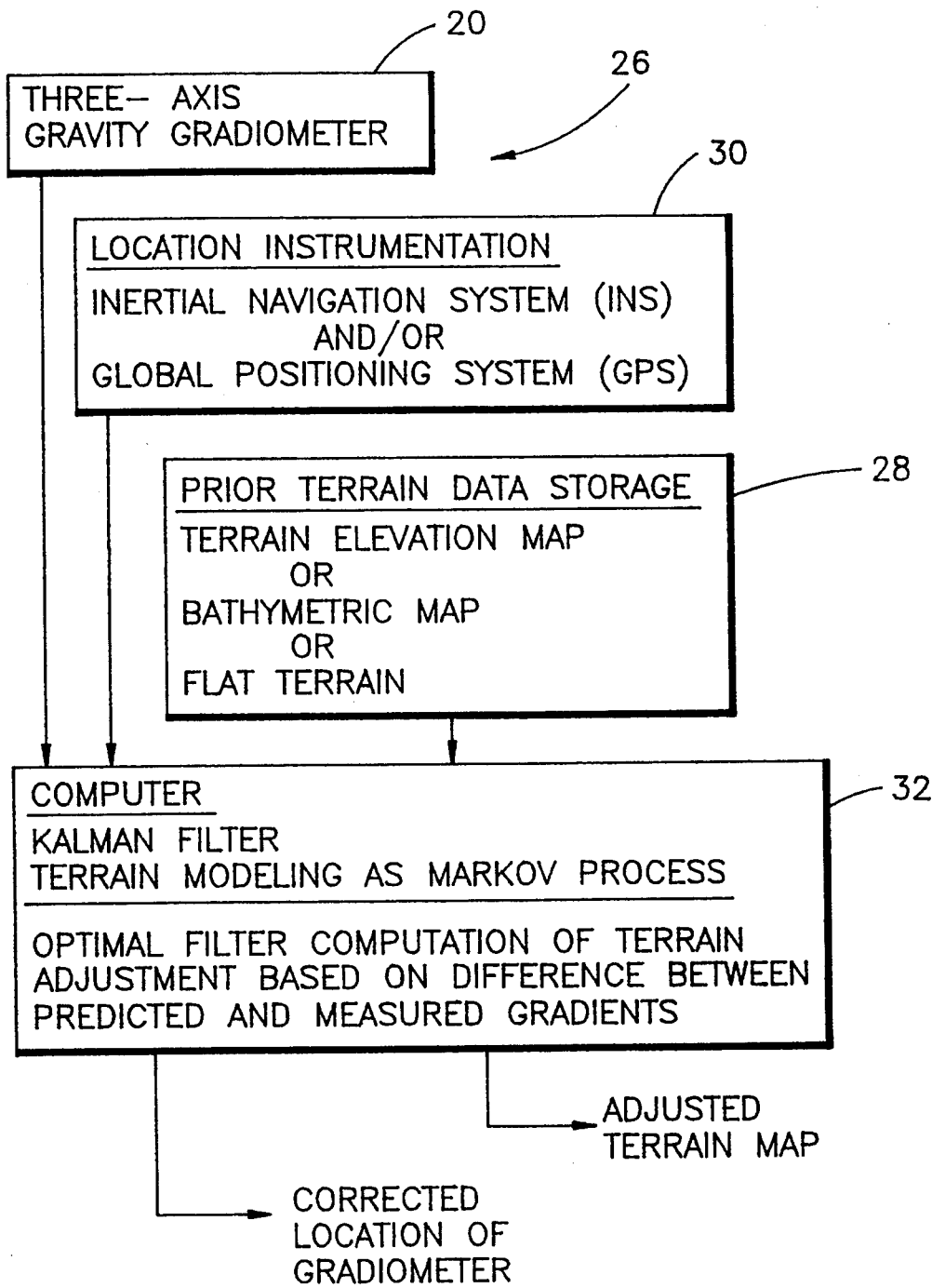
FIG. 2 is a block diagram of the gravity estimation system of the invention including the gravity gradiometer of FIG. 1.

With reference to FIGS. 1 and 2, the invention is employed with a vehicle traversing the earth's surface, and is useful in providing a map of the earth's terrain, including a map of suboceanic terrain, in those situations for which no map is available. In the event that a map of the terrain is available, the invention is useful in noting possible deviations from the map, which deviations are indicative of underground anomalies such as oil or iron deposits. Furthermore, in those situations wherein a map is available, the topographical data obtained by the invention can be compared to the map, thereby to indicate location of the vehicle in three-dimensional space. This use of the invention provides valuable navigational data, useful particularly in suboceanic travel by submarine. Also, the mode of data processing employed by the invention allows for the processing to be accomplished rapidly, in real time, to enable the navigation function to be accomplished during normal speeds of movement of a submarine, this providing for enhanced safety in avoidance of possible crash between the submarine and an underwater mountain or other geologic obstacle. A feature of the invention is that all of the foregoing functions can be accomplished in covert fashion because there is no transmission of signals outward from the vehicle during measurements of the gravity gradient.

The foregoing functions of the invention are accomplished by transporting a gravity gradiometer 20, preferably a three-axis gradiometer, within a vehicle 22 above the terrain to be observed. The vehicle 22 is an aircraft in the situation wherein the terrain is composed of mountains and valleys, and a submarine in the case wherein the terrain is the bottom of an ocean. The location of the vehicle 22 and its direction of travel are given in terms of a three-axis coordinate system 24 having three mutually perpendicular axes identified as north (N) and East (E) defining a horizontal plane, and the third axis being identified as down (D) and being directed downward to the earth's surface. The terrain estimation system 26 of the invention includes, in addition to the gradiometer 20, a memory 28 for storing map data of the terrain, location instrumentation 30 such as INS or GPS for locating the vehicle 22 relative to the terrain, and a computer 32. The computer 32 is responsive to gravity gradient data provided by the gradiometer 20, vehicle location data provided by the location instrumentation 30, and map data stored in the memory 28 for outputting adjustments to the terrain map. In addition, in the situation wherein the map is known to be accurate, the computer 32 outputs corrected navigation data for improved accuracy in describing the travel path of the vehicle 22.

The gradiometer 20 comprises three disk assemblies 34 with individual ones of the assemblies being further identified as 34A, 34B, and 34C. Each of the disk assemblies 34 comprises a disk 36 carrying a set of four accelerometers 38 disposed in a symmetrical array about a center of the disk. In the disk assembly 34A, the disk 36 rotates about an axis 40 which passes through the center of the disk 36 and is parallel to the D axis of the coordinate system 24. In the disk assembly 34B, the disk 36 rotates about an axis 42 which passes through the center of the disk 36 and is parallel to the N axis of the coordinate system 24. In the disk assembly 34C, the disk 36 rotates about an axis 44 which passes through the center of the disk 36 and is parallel to the E axis of the coordinate system 24. Also included in the gradiometer 20 is a signal processor 46 which receives signals outputted by each of the accelerometers 38 in each of the disk assemblies 34 to produce the components of the gravity gradient tensor.

In each of the disk assemblies 34, the accelerometers 38 are further identified by the legends A1, A2, A3, and A4. With respect to the signals outputted by the accelerometers 38 in any one of the disk assemblies 34, the signal processor 46 operates to subtract the sum of the signals of the A3 and the A4 accelerometers from the sum of the signals of the A1 and the A2 accelerometers to produce a difference signal, and then demodulates the difference signal with inphase and quadrature reference signals at twice the rotational frequency to produce the gradient components. This is explained in further detail, by way of example, in a copending U.S. patent application, Ser. No. 08/058,419 assigned to the present assignee, the content of which are incorporated herein by reference in its entirety. Also disclosed in that application is a more accurate form of gradiometer employing two sets of four accelerometers within a single disc assembly as well as the mechanical structure for housing a disc assembly and for extracting electrical signals from the disc assembly.

The terrain estimation system 26 of the invention may be referred to by the acronym GATES for Gravity Aided Terrain Estimate System. GATES may be operated with prior knowledge of terrain provided by an altitude or elevation map, which data is stored in the memory 28, or alternatively, with a bathymetric map of the ocean bottom in those situations wherein underwater terrain estimation is to be performed and wherein such apriori information is available to be stored in the memory 28. GATES is also operable without any of the foregoing terrain data in which case a flat terrain is assumed at a reference altitude, a flat terrain being an approximation to a relatively small region of interest in a spherical surface concentric with the earth, in which case the altitude of the flat terrain is stored in the memory 28. The system 26 is operative, as will be explained in further detail hereinafter, to predict the gravity gradient at a succession of locations of the vehicle 22 along its flight path 48, the predictions being based on presumed knowledge of the terrain. The predicted gravity gradient is compared to the actual measurement of gravity gradient provided by the gradiometer 20. A deviation between the predicted and the measured values is employed to provide a terrain map, in the case where a flat terrain has been assumed, or adjustments to a preexistent map for improved accuracy of the map, and, as noted hereinabove, to provide for improved navigation data wherein the map is known to be accurate. Also, the deviation between the predicted and measured values of the gravity gradient can be employed to locate and describe geologic deposits beneath the earth's surface.

A procedure for carrying forth the invention involves mathematical description of the gravity potential field as well as various derivatives thereof for creating the gravity gradient tensor. In addition, mathematical models of terrain and geology are developed for implementation of filtering including state space modeling of the gravity field to enable Markov processing. The processing is based on the STAG (SPERRY Three Dimensional Analytic Gravity) model. It is, therefore, useful to provide the following mathematical description.

A normal gravitational potential field which would be produced by a regular homogeneous earth is represented by U. There may also be an anomalous potential, T, such as may be due to the presence of an oil or mineral deposit or a mountain range, by way of example. Thus, the total gravitational potential field, W, is equal to the sum T+U.

The gravity disturbance vector, or first order gravity anomaly tensor, $T_i$ is given by the following expression:

$$T_i = \begin{pmatrix} T_N \\ T_E \\ T_D \end{pmatrix} = \begin{pmatrix} \frac{\partial T}{\partial N} \\ \frac{\partial T}{\partial E} \\ \frac{\partial T}{\partial D} \end{pmatrix}$$

where $T_i$ is the gravity disturbance vector (or first order gravity anomaly tensor) in the i direction.

The subscript i represents a first derivative in a single dimension such as any one of the dimensions N, E, or D of the coordinate system 24.

Accelerometer measures are given by $$A = \frac{\partial^2 R}{\partial t^2}\bigg|_i - W_i$$

Where
E is a position vector
A is an acceleration vector
t is time
i is inertial reference frame coordinate E(east), N(north), D(down)
$W_i$ is gravity force component in the i direction.

A is the acceleration of the vehicle 22 and $W_i$ is the first derivative of the total gravity potential field.

The second order gravity anomaly tensor is given by:

$$T_{ij} = \begin{pmatrix} T_{NN} & T_{NE} & T_{ND} \\ T_{EN} & T_{EE} & T_{ED} \\ T_{DN} & T_{DE} & T_{DD} \end{pmatrix}$$

$$= \begin{pmatrix} \frac{\partial^2 T}{\partial N^2} & \frac{\partial^2 T}{\partial N \partial E} & \frac{\partial^2 T}{\partial N \partial D} \\ \frac{\partial^2 T}{\partial E \partial N} & \frac{\partial^2 T}{\partial E^2} & \frac{\partial^2 T}{\partial N \partial D} \\ \frac{\partial^2 T}{\partial D \partial N} & \frac{\partial^2 T}{\partial D \partial E} & \frac{\partial^2 T}{\partial D^2} \end{pmatrix}$$

Where $T_{ij}$ is the second order gravity anomaly tensor, the subscript i represents a coordinate utilized for the first partial derivative, and the subscript j represents the coordinate for the second partial derivative.

The normal gravity gradient in units of eotvos, E, is given by $$V_{ij} = 1540 \begin{pmatrix} -1 & 0 & 0 \\ 0 & -1 & 0 \\ 0 & 0 & 2 \end{pmatrix} E$$

is the normal gravity gradient (if no anomalous field) where E is Eotvos.

The eotvos is given by $$1E = 10^{-9}/\text{sec}^2 = 10^{-9}\left(\frac{\text{cm/sec}^2}{\text{cm}}\right) = 0.1 \frac{\text{mGal}}{\text{kM}}$$

where mGAL is milligal.

One gal is defined as an acceleration of one centimeter per second per second. The constant 1540 is given by the product of the gravitational constant G multiplied by the mass of the earth divided by the cube of the radius of the earth.

Figure 3A:
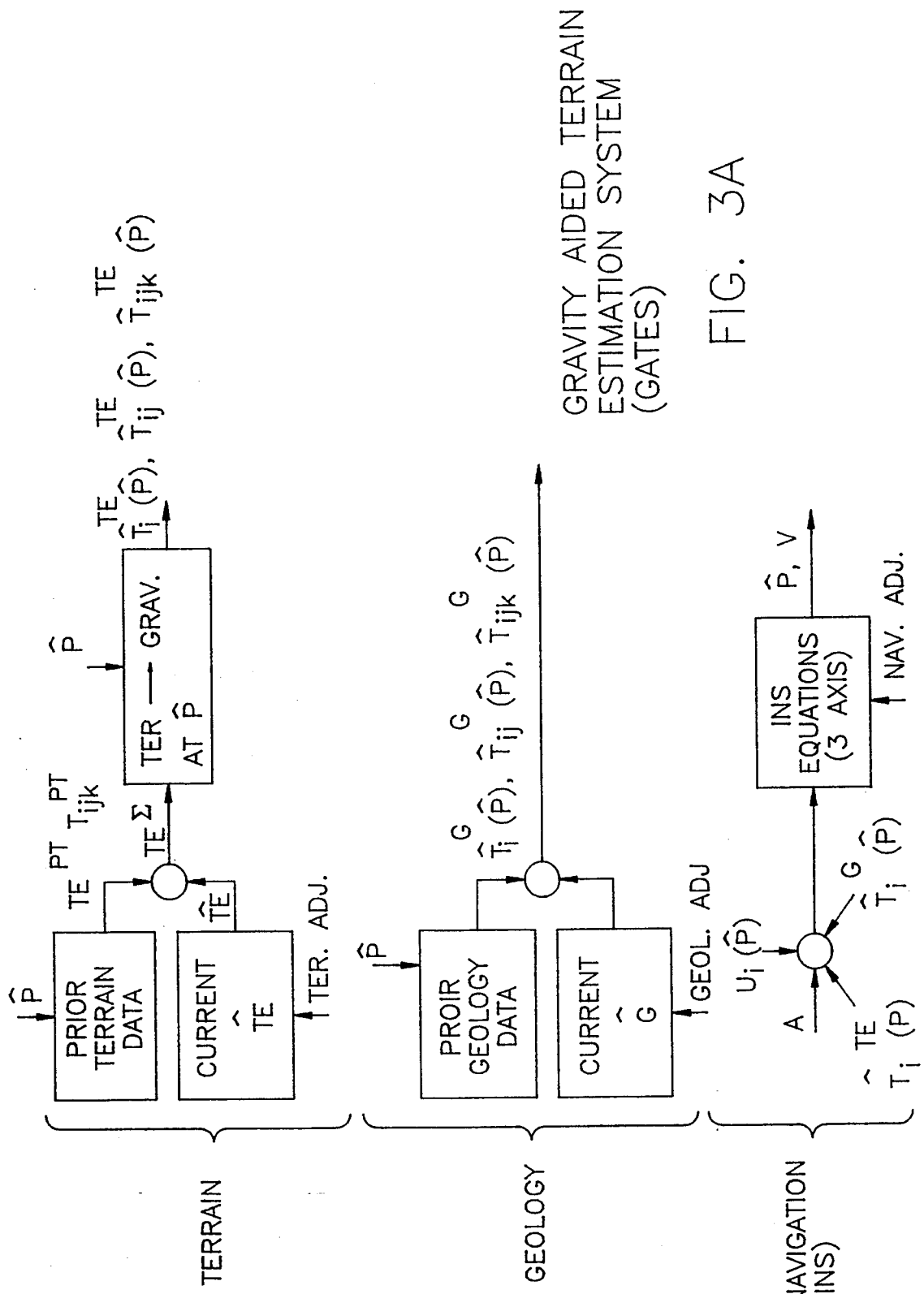

The terrain estimation system 26, or GATES, as shown in block diagrammatic form in FIG. 2 is described further, by way of mathematical symbology, in FIG. 3. FIG. 3 shows the subfunctions of terrain, geology, navigation (INS), terrain constraints, gradiometer, depth sensor, and Kalman filter. With reference to the foregoing subfunctions, the gradiometer measures the total gravitation gradient plus vehicle self gradient plus centripetal gradient due to the inertial angular rates of a platform, such as the vehicle 22 (FIG. 1), carrying the gradiometer instruments. Since the self gradient and the centripetal gradients are known to great accuracy, they can be subtracted from measured values of gradient to simplify the mathematical processing. Furthermore, the normal earth gradients which are also known prior to the measurement process, are also subtracted to simplify the mathematical processing. This leaves the local anomalous gradient comprised of the terrain and the geology components.

Before continuing with a description of the subject matter of FIG. 3, it is useful to define the mathematical expressions shown therein. The expressions have the following meanings:

| | |
|---|---|
| P | True Position of Vehicle. |
| $\hat{P}$ | Current Estimate of Vehicle Position |
| $TE^{PT}$ | Prior Terrain Height Data for an Area Surrounding $\hat{P}$ |
| $T_{ijk}^{PT}$ | Third Order Gravity Anomaly Tensor at $\hat{P}$ Computed from Prior Terrain Height Data |
| $T\hat{E}$ | Current Estimate of Terrain Height Deviation from Prior Knowledge, for an Area Surrounding $\hat{P}$ |
| $TE^{\Sigma}$ | Summation of $T\hat{E}$ and $TE^{PT}$ |
| $\hat{T}_i^{TE}(\hat{P})$ | Gravity Vector Computed from $TE^{\Sigma}$ at Position $\hat{P}$ |
| $\hat{T}_{ij}^{TE}(\hat{P})$ | Gravity Gradient Tensor Computed from $TE^{\Sigma}$ at Position $\hat{P}$ |
| $\hat{T}_{ijk}^{TE}(\hat{P})$ | Third Order Gravity Anomaly Tensor Computed from |

-continued

| | Prior Geology Data at Position $\hat{P}$ |
|---|---|
| $\hat{T}_i{}^G(\hat{P})$ | Current Estimate of the Gravity Gradient Tensor Due to Geology at Position $\hat{P}$ |
| $\hat{T}_{ij}{}^G(\hat{P})$ | Current Estimate of the Third Order Gravity Anomaly Tensor Due to Geology at Position $\hat{P}$ |
| $\hat{T}_{ijk}{}^G(P)$ | Current Estimate of the Third Order Gravity Anomaly Tensor Due to Geology at Position $\hat{P}$ |
| Q | Positions at which Terrain Constraints are to be Applied. |
| $TE^\Sigma(Q)$ | Current Estimate of Terrain Height at Constraint Points Q. |
| $TE^c(Q)$ | Terrain Height Constraints at Points Q. |
| $TE^{c\Sigma}(Q)$ | Difference Between Estimate and Constraint at Points Q. |
| $W_{ij}(P)$ | Total Gravity Gradient Tensor as Measured by the Gradiometers at Position P. |
| $U_{ij}(\hat{P})$ | Normal Earth's Gravity Gradient Tensor at Position $\hat{P}$, as Computed from an Ellipsoidal Earth Model. |
| SG | Gravity Gradient Tensor from the Vehicle Self Gradient. |
| CG | Centripetal Gradient Term |
| $T_{ij}{}^\Sigma$ | $W_{ij}(P)-U_{ij}(\hat{P})-T_{ij}{}^{TE}(\hat{P})-SG-CG-\hat{T}_{ij}{}^G(\hat{P})$ The Difference Between Measured and Predicted Gravity Gradient Tensor. |
| A | Vehicle Acceleration Vector as measured by the Inertial Navigation System (INS) Accelerometers (Including the Gravity Vector. |
| $U_i(\hat{P})$ | Normal Earth's Gravity Vector at Position $\hat{P}$ as Computed from Ellipsoidal Earth Model. |
| $\hat{V}$ | Current Estimate of Vehicle Velocity |
| LIN X WRT Y | Linearisation of Variable X with Respect to Variable Y |
| $D_\Sigma$ | Difference Between Vehicle Height/Depth Measurement and Predicted Value (P) from INS. |
| $\tilde{P}$ | Position Error $\hat{P} - P$ |
| $\tilde{V}$ | Velocity Error $\hat{V} - V$ |

The current terrain and geology estimates, based on measurements at the current estimated position of the vehicle 22 may be accessed in terms of predicted gradients, and are subtracted from the gradient measurements to produce the anomalous gradient innovation. This innovation is zero in the situation wherein the measurements confirm the presumed model of the earth's terrain and geology. A nonzero value of the innovation indicates an error in the estimate of current terrain and/or geology, or a navigational error which is reflected as an error in the current estimated position of the vehicle 22 and its gradiometer 20. Thus, the nonzero value of the innovation leads to an incorrect accessing of terrain and geology estimates. By observing the behavior of the anomalous gradient innovations over an interval of time, together with the behavior of terrain, geology, and navigation errors in conjunction with a measure of how these errors influence the anomalous gradient innovations, the Kalman filter generates incremental adjustments to these three processes.

If prior terrain constraints are known, such as terrain height at location Q, namely $TE_c(Q)$, then this constraint can be imposed as follows. Access terrain height estimate $TE^\Sigma(Q)$ at location Q and subtract from the known terrain height $TE^c(Q)$. The resulting difference $TE^{c\Sigma}(Q)$ constitutes an innovation to be operated on the Kalman filter.

A third innovation available for most submersibles, this being the situation wherein the vehicle 22 is presumed to be a submarine traveling beneath the surface of the ocean, results if initial vertical position is differenced with a depth sensor output producing the error which is used by the Kalman filter to stabilize and to correct the inertial vertical channel, and also to correct horizontal INS velocity error which couple through coriolis acceleration into the vertical channel.

The Kalman filter incorporates models of geology, terrain, and navigation (INS) errors. The Kalman filter also incorporates the linear relationships between innovations and system error states. Since the terrain components of gradients are normally nonlinearly related to terrain states, a local linearization is used, centered on the current terrain estimate. The outputs of the Kalman filter are incremental corrections or adjustments to terrain, geology and navigation states linearly related to the three innovation processes.

The tensor representing the gravity gradient for a single point mass along a specific direction from a measuring point to the point mass has only diagonal terms wherein the term in the upper left corner is the product of the gravitational constant multiplied by the mass and divided by the cube of the distance between the measuring point and the point mass. The remaining two terms in the diagonal of three terms are equal to each other and equal to minus one-half the value of the aforementioned term in the upper left corner of the tensor. The two negative terms are referred to as curvature gradients. In the general case of a continuum of mass, the gradient of nine terms, comprising three rows by three columns, has natural symmetry wherein there are equal off-diagonal terms, and the differentiation of the partial derivatives can be done in either order. This reduces the total number of independent variables to six variables. However, due to the fact that the potential field observes the Laplace constraint wherein the sum of the diagonal terms is equal to zero, the total number of independent variables is reduced to five independent variables.

The optimal filtering provided by the Kalman filter is used herein to combine gradient measurements with INS data plus height and/or depth sensing information, as well as with a prior knowledge of the terrain. The filter output enables the creating of a map of terrain elevation versus location in the north by east coordinate plane of the coordinate system 24 (shown in FIG. 1). The center of the map is the present location of the vehicle 22. Upon movement of the vehicle 22 to a new location, map data of the earlier location is employed for improved accuracy in the generation of the map for the present location of the vehicle. Included with the prior knowledge of the terrain are the gravity component increments due to deposits within the earth like a salt dome or an iron ore deposit. Furthermore, particularly in the case wherein the vehicle is a submarine, navigational adjustments such as a known depth or a known location of a specific submerged object or geologic formation may be employed to increase accuracy of the map.

The terrain and geology are to be modeled by a statistical mathematical form, such as the use of the aforementioned well known STAG model. The following modeling is employed:

For Terrain (land or sea)

$$E(h_1, h_2) = \frac{V_h}{\sqrt{1 + \frac{(D_N^2 + D_E^2)}{D_A^2}}}$$

where:
- $E(h_1, h_2)$ = Cross covariance of terrain height at points 1 and 2.
- $V_h$ = Variance of terrain height from terrain modeling
- $D_N$ = North distance between points 1 and 2
- $D_E$ = East distance between points 1 and 2
- $D_A$ = Correlation distance for terrain term from terrain modeling For residual geology $$E(T_1, T_2) = \frac{V_T}{\sqrt{\frac{(1 + Z_1 + Z_2)^2}{D_G^2} + \frac{(D_N^2 + D_E^2)}{D_G^2}}}$$

where:
- $V_T$ = Variance of gravity potential anomaly for residual geology.
- $Z_1, Z_2$ = Height above sea level of each observation point.
- $D_G$ = Correlation distance for geology term from modeling
- $E(T_1, T_2)$ = Cross covariance of gravity potential anomaly at points 1 and 2.

A number of the foregoing terms, typically from three to six of these terms, or eight of these terms, are employed in the preferred embodiment of the invention and are to be referred to as shells. The shells are used to model a broad range of spatial frequencies and, in their geometrical three-dimensional form, may be regarded as having similarity to a truncated Fourier series of sinusoid of differing spatial wavelength wherein the summation of the series of sinusoids produces a desired waveform or surface. In similar manner, a set of the shells may be summed together to provide an estimate of the terrain surface wherein the set of shells includes shells of relatively sharp peaks, or high-spatial frequency shells, as well as shells having relatively broad peaks, which may be referred to as shells of relatively low-spatial frequency. However, as an example in the practice of the invention, prior to an actual measurement of gravity gradient, the terrain surface may be presumed to be locally flat, this corresponding to a portion of the spherical global surface, wherein the magnitude of the various component shells are selected so that the series of shells sums to produce the flat surface.

Figure 4:
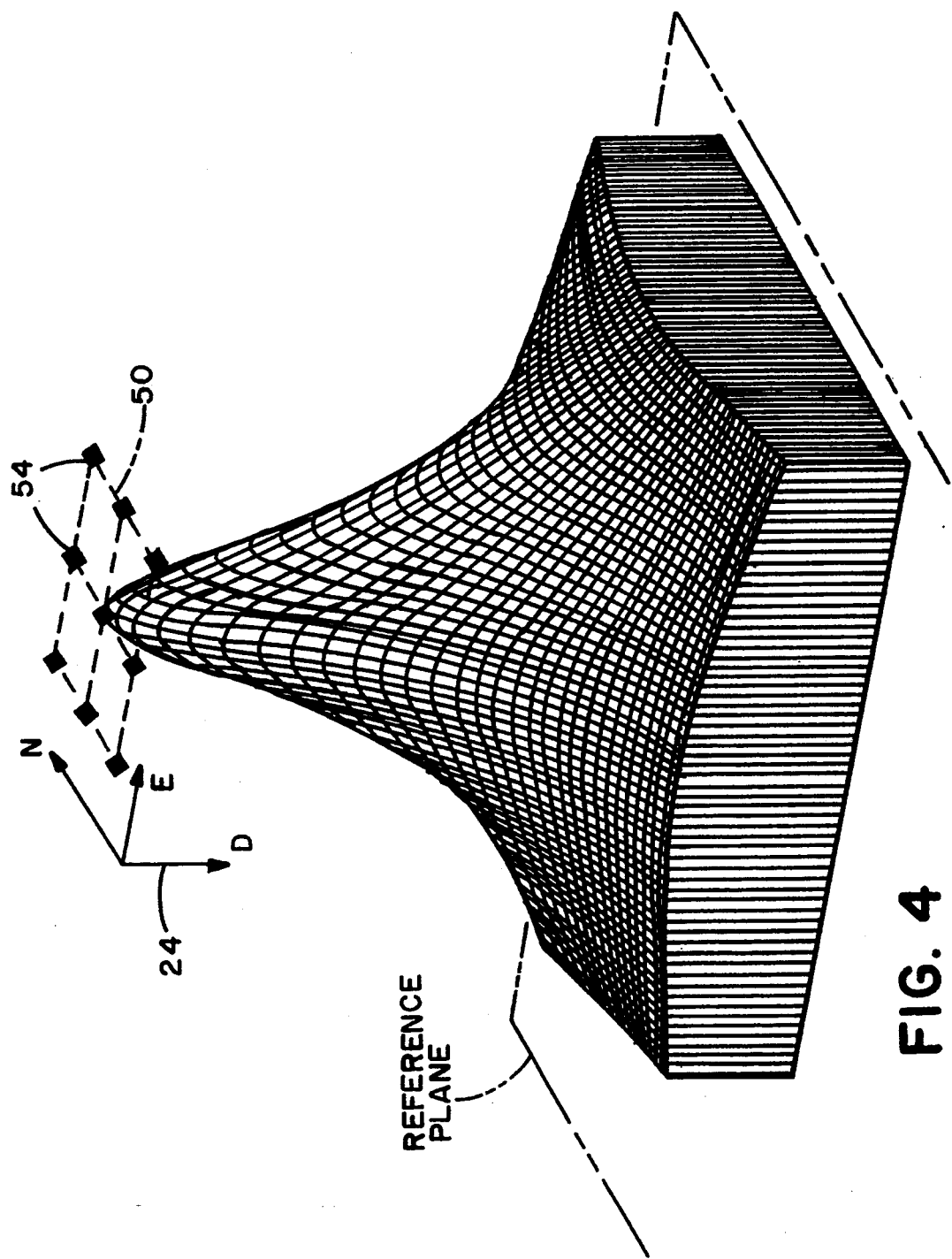
FIG. 4 is a perspective view of a portion of a shell used in a mathematical transformation of altitude wherein a sum of shells of differing spatial frequency are employed to represent an increment in altitude; by way of example, the portion of the shell is represented as a hill, it being understood that the mathematical transformation applies also to a negative hill or depression.
Figure 5:
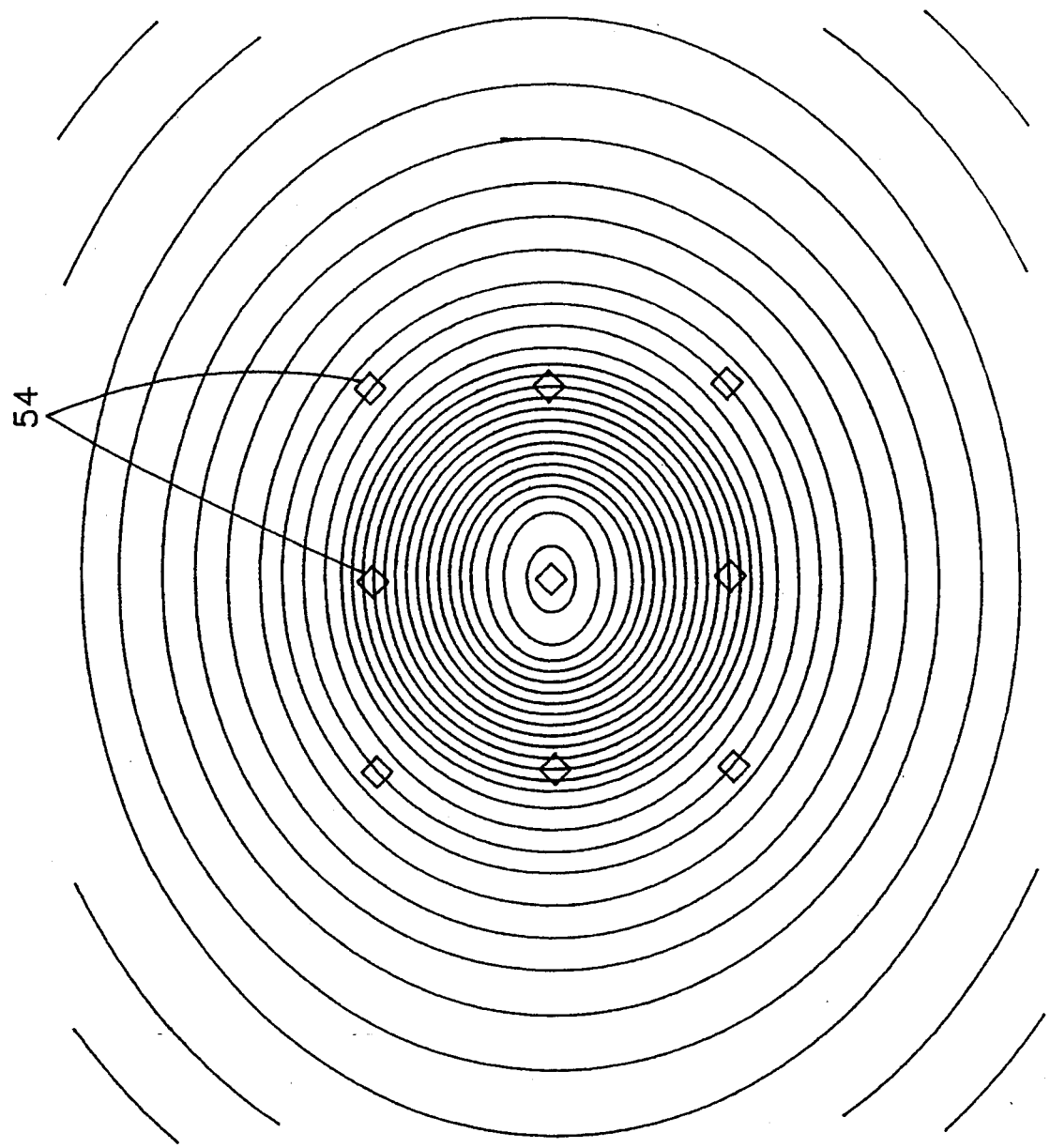
FIG. 5 is a plane view of the surface of the shell of FIG. 4 shown as a contour map.
Figure 6:
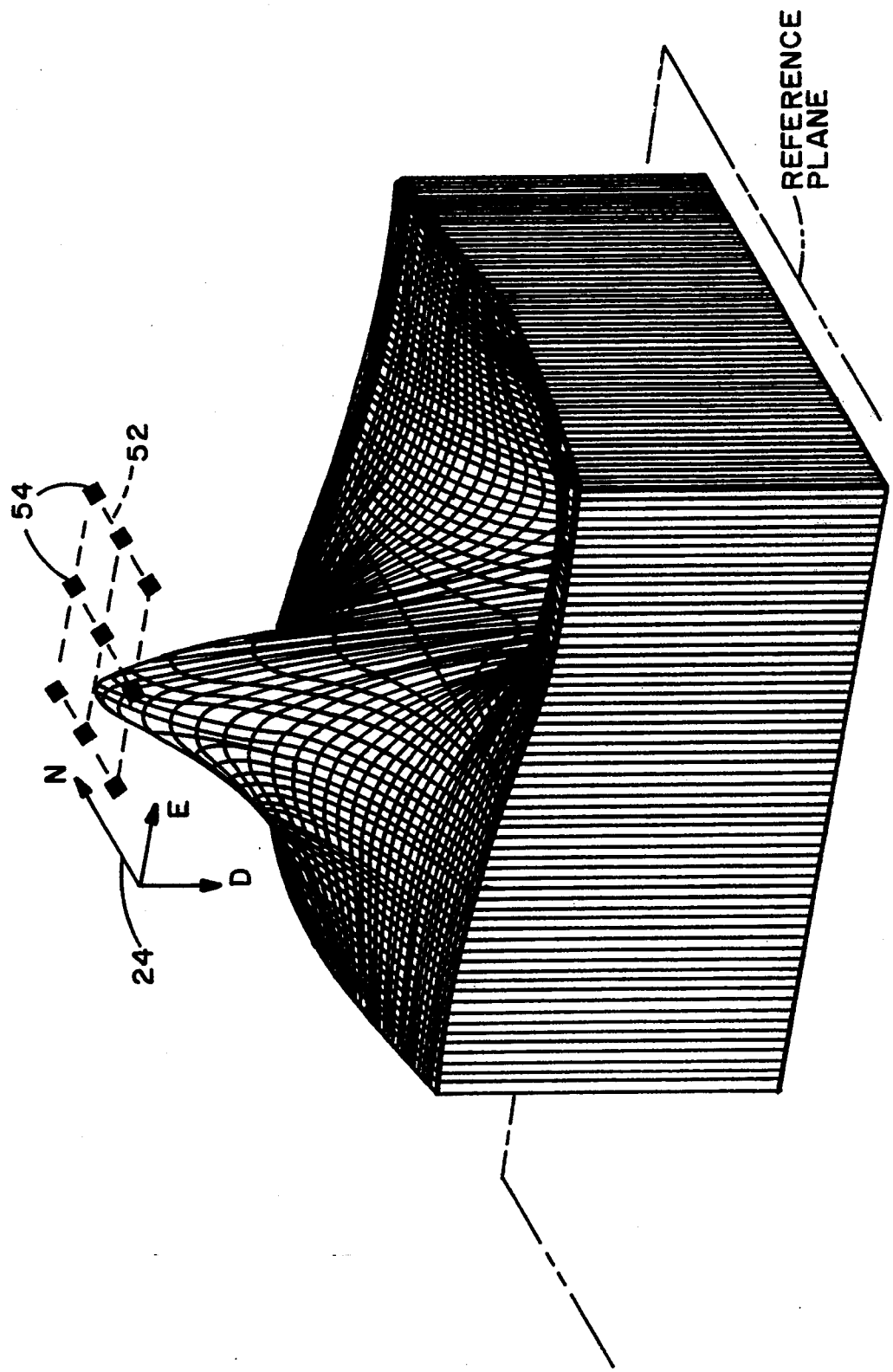
FIG. 6 is a view, similar to that of FIG. 4, but showing an alternative configuration of a shell having both a hill, and a depression disposed alongside the hill, the figure showing the depression positioned east of the hill by way of example.
Figure 7:
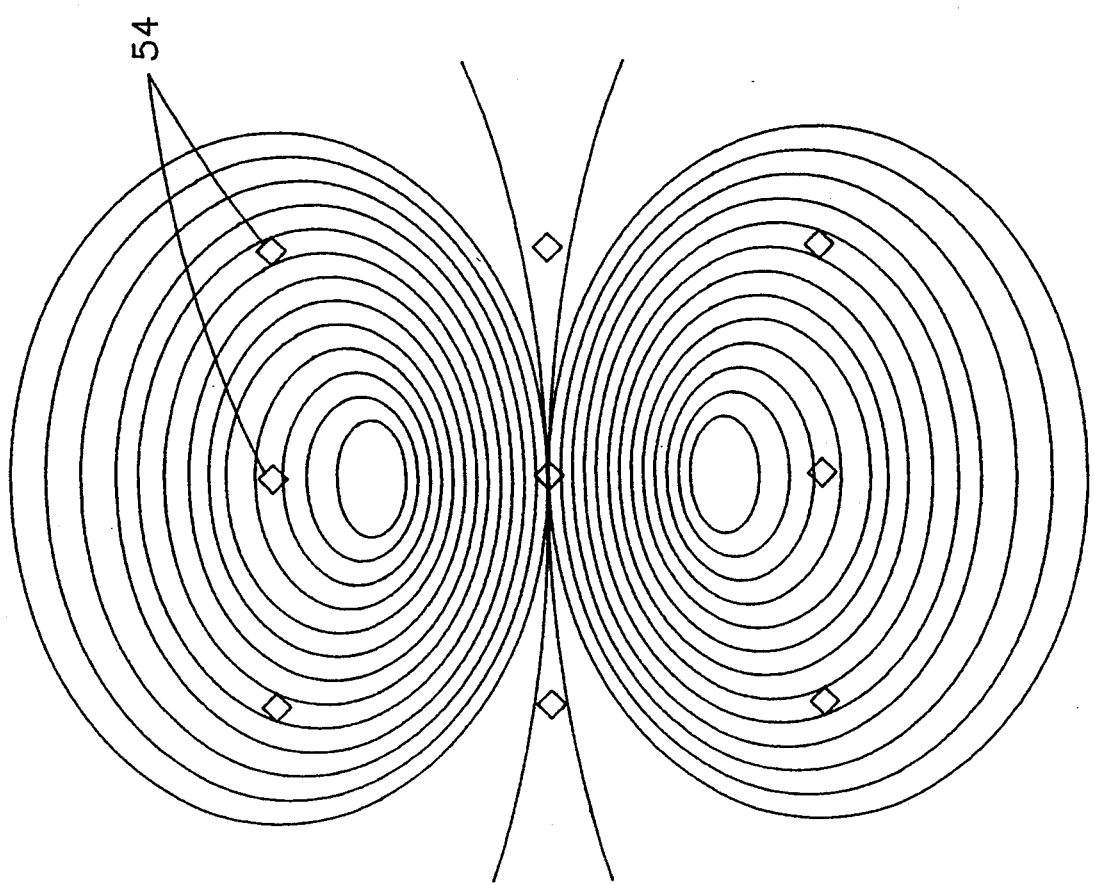
FIG. 7 is a plan view of the surface of the shell of FIG. 6 shown as a contour map.

Alternatively, in locations which are known to have mountainous peaks, the series of shells would be modified to provide for greater magnitude of the higher frequency shells to produce the mountainous surfaces. Examples of the shells are shown in FIGS. 4–7 wherein FIG. 4 shows a single peaked shell in perspective view, FIG. 5 shows a plan view of the shell wherein the contours show regions of equal height above a reference plane, FIG. 6 shows a perspective view of a shell characterized by both a peak and a depression, and FIG. 7 is a plan view showing contours of the shell of FIG. 6 wherein the contours describing the peak represent regions of equal height and wherein the contours describing the depression represent regions of equal depth. By choosing the location of the reference plane to be at a location well below the deepest point of the depression, all contours including the contours of the depression represent height above the reference plane.

Figure 8:
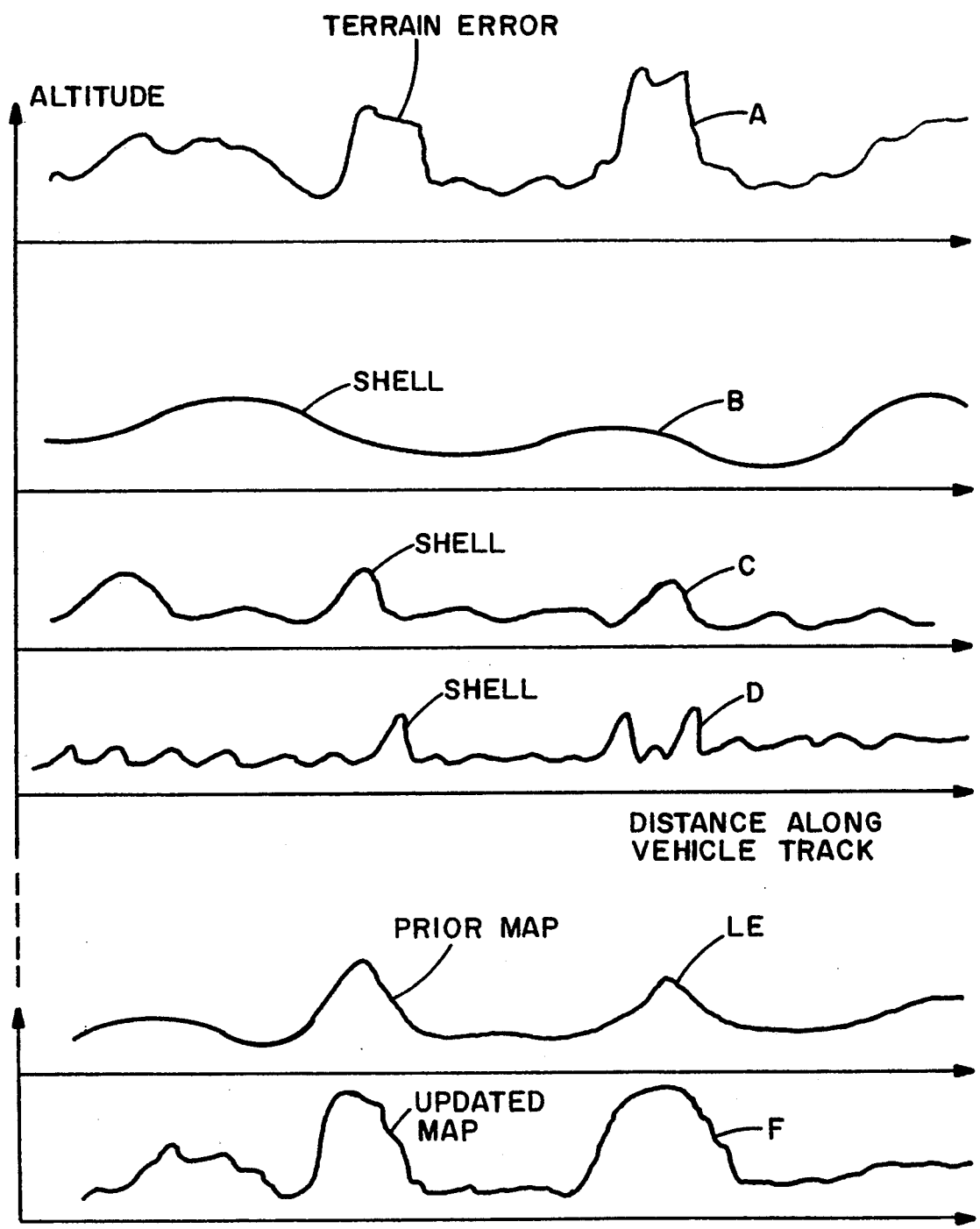
FIG. 8 is a set of graphs depicting summation of shells of differing spatial frequencies to produce a resultant configuration of terrain.

The set of graphs of FIG. 8 shows, in stylized fashion, the summation of various component shells to produce a representation of terrain. FIG. 8 is understood to be stylized and is not drawn to scale. Therein, the terrain at the top of FIG. 8, representing the difference between prior knowledge of the terrain and a best estimate of the terrain is portrayed by graph A, and is produced by summation of a low frequency component shell surface of graph B plus a shell component at mid-frequency of graph C plus a shell component at a relatively high spatial frequency portrayed in graph D. As portrayed in the graphs of FIG. 8, the amplitudes of the higher frequency waveforms predominate in the regions of peaks of the mountains in the terrain of graph A. Graph E shows the terrain based on a prior map, and graph F shows an updated view of the terrain. Graph A is the difference between the two graphs E and F.

Terrain parametrization is accomplished with the aid of the foregoing shell and in a manner which facilitates management of the Kalman filter with an algorithm employing reasonable dimensionality for efficient parametrization of terrain. For example, parametrization which reduces the number of shells and which reduces the number of constraints describing each shell enables the Kalman filter to operate sufficiently fast so as to provide for real-time outputting of map and navigation data from the filter. This is useful to a pilot of the vehicle carrying the gradiometer for increased accuracy in maintaining a desired course of travel. In particular, the efficient parametrization of terrain has the following attributes, namely, consistency with terrain models, and fine resolution near the gravity sensors and coarser resolution at greater distances corresponding to sensitivity of the sensors to anomalous mass proximity. A further attribute is the ability to predict in real-time the terrain ahead and to the sides of the vehicle track, this serving to facilitate terrain following and terrain avoidance (TF/TA). Yet another attribute of the parametrization is the reduction of memory requirement and reduction of dimensionality to enable operation of the estimation system with currently available computer technology.

This is accomplished by characterizing each shell with a 3×3 array 50 (shown in FIG. 4) and 52 (shown in FIG. 6) of equally spaced points centered near the location of the vehicle 22 (shown in FIG. 1). Each of the arrays 50 and 52 extend in the north by east plane, as shown by the coordinate system 24, wherein the columns of the arrays 50 and 52 are parallel to the north (N) axis and the rows are parallel to the east (E) axis. Each of the arrays 50 and 52 may be square or rectangular as may be convenient for describing the terrain, the square array being employed in the preferred embodiment of the invention. Each point 54 of the set of nine points in each of the arrays 50 and 42 is fixed in geographic location and consists of three states of parameter, namely, terrain height (or depth) measured along the D axis, the component of slope of the shell surface (north slope) as measured in the direction of the north axis, and the component of slope of the shell surface (east slope) as measured in the direction of the east axis. Thus, each shell consists of the product of the three states of each point multiplied by the nine points to give a total of twenty seven states. The arrays 50 and 52 are centered normally near the vehicle location. As the vehicle progresses, if its updated location be greater than, for example 60% of the track spacing from the array center in the north or east direction, then a new array of points is constructed by adding an additional row or column on one side of the previous array and deleting the corresponding row or column at the opposite side of the previous array. Thus, the array of points 54 is maintained at its value of nine points which is most advantageous in enabling the use of a finite amount of memory so as to accomplish the real-time operation of the invention. The foregoing process of updating the location of an array 50, 52 is carried out independently for each shell.

By way of example in the construction of the shells, if the spacing between peaks of a lower frequency shell is double the spacing of the next higher frequency shell, then the spacing between the points 54 of the corresponding arrays 50, 52 is also doubled. The ratio of the peak spacing among the shells of the various spatial frequencies is preferably at a fixed ratio, such as a factor of two, a factor three, or a factor of four, by way of example. A ratio of 2 is employed in the practice of the preferred embodiment of the invention. Therefore, during movement of the vehicle 22 above the earth's surface, the array 50, 52 for the highest frequency Shell would have to be displaced (by the addition of points 54 on one side and the deletion of the points on the opposite side) twice as often as in the case of the next lower-frequency shell. In FIGS. 4 and 5, the respective surface and contour plots depict the situation wherein the height at the center point of the array 50 is set equal to the peak of the shell surface. In the situation depicted in FIGS. 6 and 7, the center point of the array 52 is set at the location wherein the north slope of the shell surface has a value of zero and the east slope has a maximum value.

The resulting surface representing terrain height produced by summation of all of the shells at the various spatial frequencies is employed, in accordance with a feature of the invention, for calculating the gravity field in terms of the gravity gradients. An example of such a terrain height surface is shown at 56 in FIG. 9. The surface 56 has the shape of a portion of a hill. The computation of the gravity field at the location of the gradiometer 20 is accomplished by the process wherein the surface 56 is first approximated by a set of flat top prisms 58 of various cross sectional areas and of various heights. In particular, the flat tops of the prism 58 are of relatively small cross sectional area in the terrain near the vehicle 22, and have larger areas at increasing distance from the vehicle 22. The gravity contributions are calculated from equations at each of the eight corners or vertices of the prisms, and the resulting contributions from each of the prisms are summed to give the total gravity field. The equations relating the contribution of a single prism are based on the North (N) east (E) and down (D) coordinates identifying the vertices of the prism, some of these identifying coordinates being shown in FIG. 9 for a prism 58. In addition, each prism is understood to be constructed of material having a density equal to the earth of the hill in FIG. 9 at which the prism 58 is standing. The coordinate axis system 24 is shown within the vehicle 22 wherein the origin of the coordinate system 24 is located at the observation point, and wherein the locations of the vertices of the respective prisms 58 are based on the location of the coordinate system 24 within the vehicle 22.

These equation sets include all permutations for N, E and D.

$$T_N = GP(N \times \text{TAN}^{-1}\left(\frac{E \times D}{N \times R}\right) -$$

$$E \times \text{LOG}_e(D + R) - D \times \text{LOG}_e(E + R)) \Big|_{N_1}^{N_2} \Big|_{E_1}^{E_2} \Big|_{D_1}^{D_2}$$

$$T_E = GP(-N \times \text{LOG}_e(D + R) +$$

$$E \times \text{TAN}^{-1}\left(\frac{N \times D}{E \times R}\right) -$$

$$D \times \text{LOG}_e(N + R)) \Big|_{N_1}^{N_2} \Big|_{E_1}^{E_2} \Big|_{D_1}^{D_2}$$

$$T_D = GP(-N \times \text{LOG}_e(E + R) E \times \text{LOG}_e(N + R) +$$

$$D \times \text{TAN}^{-1}\left(\frac{N \times E}{D \times R}\right) \Big|_{N_1}^{N_2} \Big|_{E_1}^{E_2} \Big|_{D_1}^{D_2}$$

$$T_{NN} = -GP(\text{TAN}^{-1}\left(\frac{E \times D}{N \times R}\right) \Big|_{N_1}^{N_2} \Big|_{E_1}^{E_2} \Big|_{D_1}^{D_2}$$

$$T_{NE} = GP(\text{LOG}_e(D + R)) \Big|_{N_1}^{N_2} \Big|_{E_1}^{E_2} \Big|_{D_1}^{D_2}$$

$$T_{ND} = GP(\text{LOG}_e(E + R)) \Big|_{N_1}^{N_2} \Big|_{E_1}^{E_2} \Big|_{D_1}^{D_2}$$

-continued $$T_{EE} = -GP\left(\text{TAN}^{-1}\frac{N \times D}{E \times R}\right)\Big|_{N_1}^{N_2}\Big|_{E_1}^{E_2}\Big|_{D_1}^{D_2}$$

$$T_{ED} = GP(\text{LOG}_e(N + R))\Big|_{N_1}^{N_2}\Big|_{E_1}^{E_2}\Big|_{D_1}^{D_2}$$

where:

$$T_N = \frac{\partial T}{\partial N}$$

$$T_{NN} = \frac{\partial T_N}{\partial N} = \frac{\partial^2 T}{(\partial N)^2}$$

etc.

G = Universal gravitational constant
P = Density of prism
R = $(N^2+E^2+D^2)^{\frac{1}{2}}$
N = Distance North
E = Distance East
D = Distance Down wherein R, N, E, and D are measured from the origin of the coordinate system 24

If desired, the arrays 50 and 52 may have four or five points 54 in each row and in each column for greater accuracy in describing a shell. However, such enlarged array is disadvantageous in that the requirement for computer memory is increased and the number of computations per second, for real time computation, is increased. Accordingly, in the preferred embodiment of the invention, each row and each column of the array 50, 52 has only three of the points 54.

In the operation of the estimation system and with reference to the foregoing description, known aspects of the gravitational field, namely, the self gradient, the centripetal gradients, and the normal earth gradients are subtracted from the gradiometer measurements to leave only the local anomalous gradient comprised of the terrain and the geology components. The transformation of the altitude surface to, or representation of the altitude surface by, the summation of the shells is employed, in accordance with a feature of the invention, for updating the measurement of altitude. Thus, in the operation of the Kalman filter, the altitude at the various locations of the map describing the terrain is presumed to be known at the beginning of measurement procedure. Data of the mountains and valleys is already stored, or a locally flat earth surface is presumed. Then, each shell is provided only with incremental altitude data, rather than the full value of the altitude data, to provide for an updating of the altitude from the prior known value of the altitude. The very first measurement of the gravity provides for an incremental correction of the altitude map from the previously stored map. The next measurement of the gravity improves upon the knowledge of altitude obtained by the original map and the first measurement. In this way, for each specific location of the vehicle 22, as the vehicle 22 carrying the gradiometer 20 proceeds along the track of its flight path 48 (shown in FIG. 1) during measurement of gravity gradient, improvements in the determination of the altitude at that specific location are provided by the corrections to the altitude map. The improvements are based on data obtained during earlier positions of the vehicle 22 along its flight path 48.

The raw data employed in each measurement comprises the gravity gradients related to terrain and measured by the gradiometer 20. Then, by use of the prior knowledge of the terrain altitude map in conjunction with the summation of the shells plus prior altitude data to give the best estimate of the terrain surface, the Kalman filter computes the gravity gradients which would be produced by terrain having the estimated terrain surface. The computation of the gradients is accomplished by the quantization of the terrain surface by use of the aforementioned prisms 58 depicted in FIG. 9. Thereupon, the comparison is made between the computed expected values of gradient and the actual measured values of gradient. If the difference is zero, then there is a zero value of innovation. If the difference between the expected and measured values of gradient is nonzero, then there is a nonzero value of innovation. In the latter case, the Kalman filter provides for an adjustment of the estimated values of altitude so as to produce equality between the expected and measured values of the gradient. It is noted also that the linear relationship among the entries to the Kalman filter is provided in the foregoing set of equations derived for each vertex of each of the prisms 58.

Figure 10A:
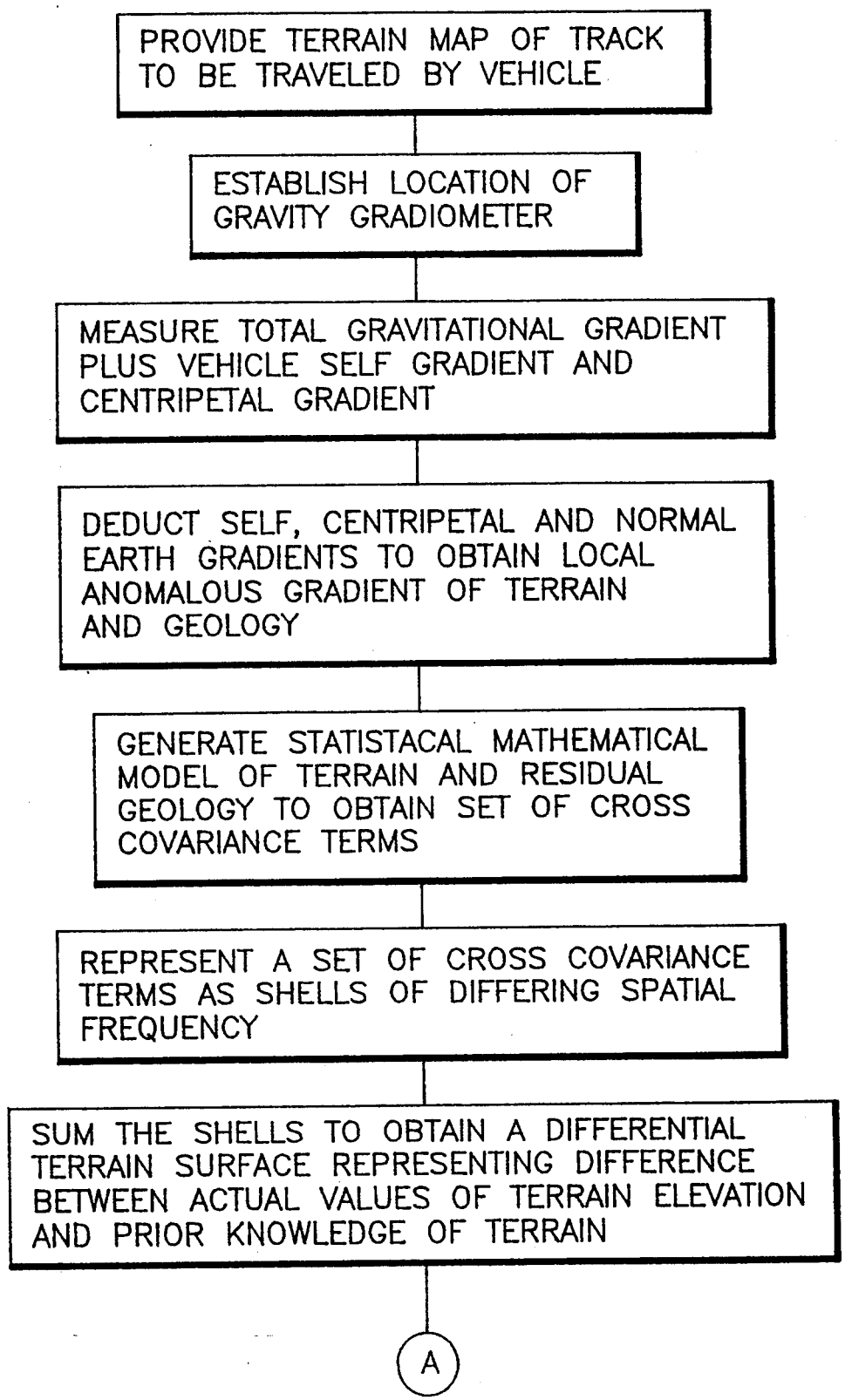
FIGS. 10A & 10B are block diagrams showing steps in carrying forth the gravity estimation procedure of the invention.
Figure 10B:
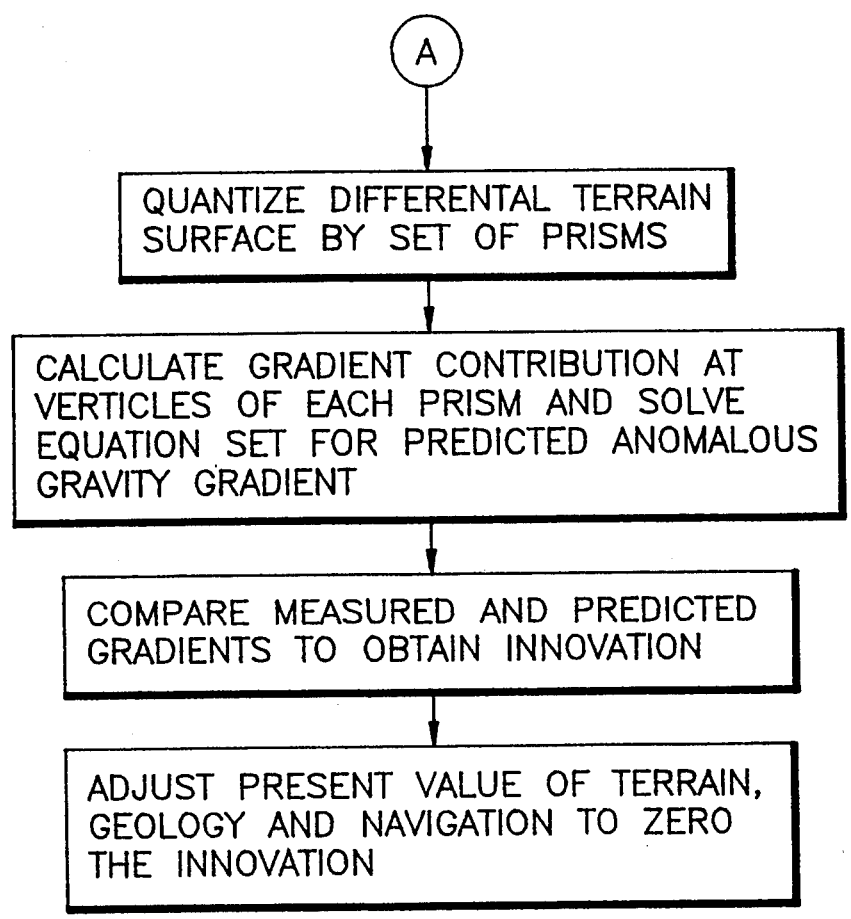

FIGS. 10A and 10B taken together show a diagram presenting steps in the procedure for the terrain estimation in accordance with the invention. First, prior knowledge of the terrain over which the vehicle is to travel is provided by a map in block 60. At block 62, the location of the vehicle carrying the gravity gradiometer is established by use of an inertial navigation system and/or a global positioning system. The gravity gradiometer is employed to measure the total gravitation gradient at block 64, the measurement including also the vehicle self gradient and centripetal gradient. From this measurement, there are deducted the self, centripetal and normal earth gradients to obtain the local anomalous gradient of terrain and geology, as shown at block 66. Then, at block 68, there is generated a statistical mathematical model of terrain and residual geology to obtain a set of cross-covariance terms. The set of cross-covariant terms are represented as shells of differing spatial frequency, as shown at block 70. At block 72, the shells are summed to obtain a differential terrain surface representing a difference between a best estimate of the terrain surface and the prior knowledge of the terrain.

Figure 9:
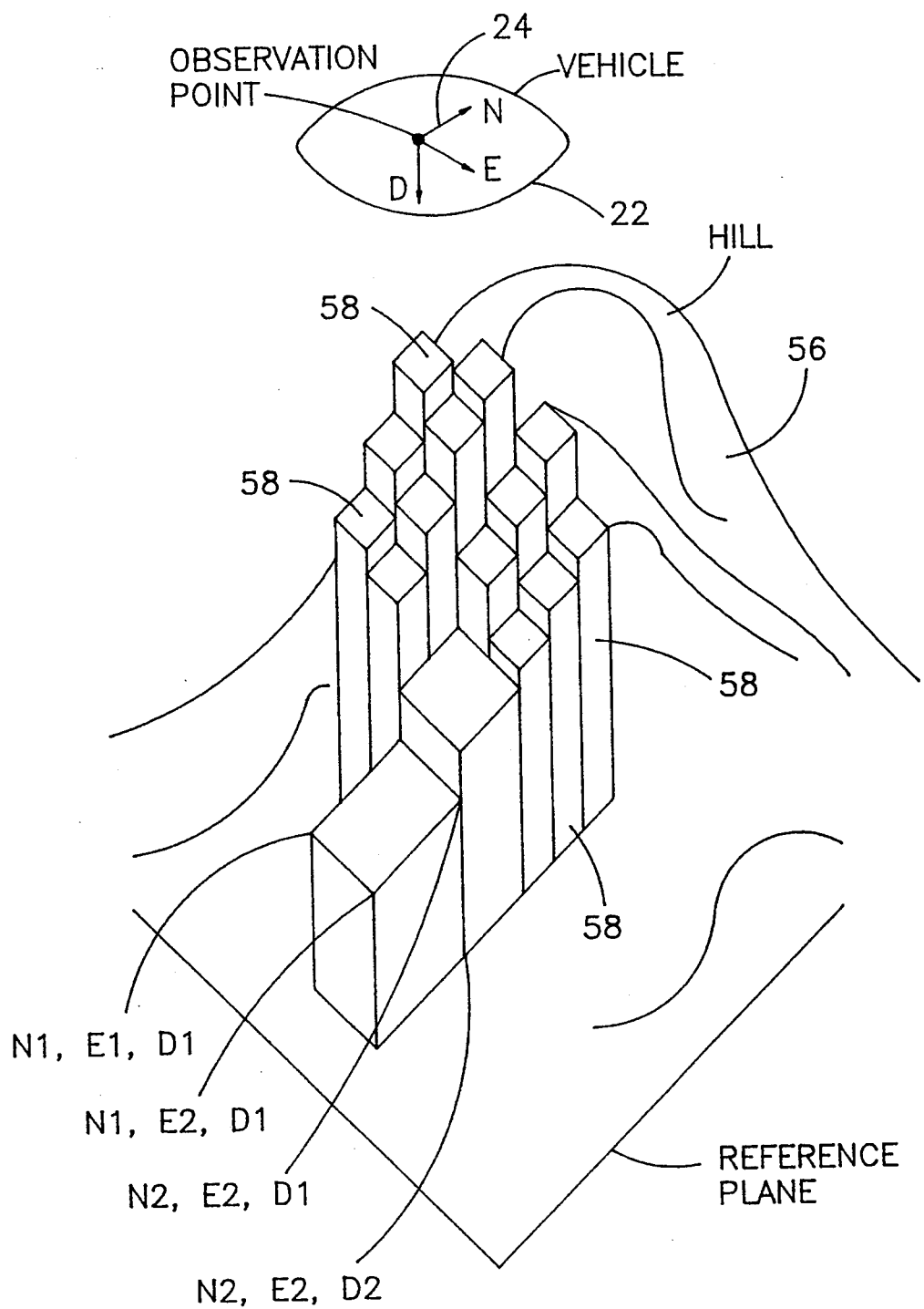
FIG. 9 shows quantization of a terrain surface by a set of prisms for use in development of a set of linear equations for operation of the filter of FIG. 3.

The procedure continues at block 74 wherein the differential terrain surface is quantized by representing the terrain surface by a set of the prisms 58, shown in FIG. 9. Then, at block 76, there is performed a calculation of the gradient contribution at the vertices of each of the prisms, with the resulting set of equations being solved to obtain the predicted anomalous gravity gradient. At block 78, a comparison is made between the measured values of gravity gradient and the predicted values of gravity gradients to obtain an innovation. Then, at block 80, the present values of terrain, geology, and navigation data are adjusted to know the innovation. In this way, the invention provides for an efficient and real-time procedure for obtaining accurate data of terrain, geology, and navigation by measurement of the earth's gravitational field.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A terrain estimation system comprising
a gravity gradiometer providing measured values of gravity gradient;
a memory storing terrain altitude data along a path to be traveled by said gradiometer;
location means for obtaining current location of said gradiometer during travel of said gradiometer along said path;
optimal filter means, operative in response to a statistical model of terrain and residual geology for calculating predicted values of gravity gradient to be sensed by said gradiometer at successive locations along said path, said terrain and said residual geology being based on data stored in said memory, gradiometer locations along said path being based on data obtained by said location means; and
wherein said filter means is operative further to compare measured and predicted values of gravity gradient to determine the presence of a deviation between measured and predicted values of gravity gradient, a nonzero value of the deviation being representative of an error in earth terrain data or in residual geology data or in gradiometer location data, said filter means being operative to null said deviation by correction of said earth terrain data or said residual geology data or said gradiometer location data.

2. A system according to claim 1 wherein said gradiometer is carried by a vehicle, said system further comprising means for deducting self and centripetal vehicular gravity gradients and normal earth gravity gradients from measured values of gravity gradient to obtain local anomalous gravity gradient of terrain and geology, and wherein said calculating of predicted values of gravity gradient is a calculating of predicted values of anomalous gravity gradient.

3. A system according to claim 1 wherein said statistical model employs a set of cross covariance terms of terrain and residual geology, the cross covariance terms having the form of shells of differing spatial frequency.

4. A system according to claim 3 wherein, in said statistical model, each of said shells has a surface curvature in three dimensions, and wherein a sum of a set of the shells at the different spatial frequencies represents terrain surface data to enable said filter means to null said deviation between measured and predicted values of gravity gradient in real time.

5. A system according to claim 3 wherein, in said statistical model, each of said shells is represented by a grid having a set of grid points arranged in an array of rows and columns.

6. A system according to claim 5 wherein, in said statistical model, each of said grids has at least three rows and three columns of the grid points.

7. A system according to claim 6 wherein, in each of said shells of said statistical model, each of said grid points is constituted by three parameters, a first of said parameters being height of the shell at the grid point above a reference surface, a second of said parameters is a slope of the shell at the grid point measured in a north south vertical plane, and a third of said parameters is a slope of the shell at the grid point measured in an east west vertical plane.

8. A system according to claim 7 wherein, in the respective ones of said shells of said statistical model, the grid points of a shell of higher spatial frequency are located more closely together than the grid points of a shell of lower spatial frequency.

9. A system according to claim 8 wherein, in the shells of said statistical model, the summation of the parameters of grid points positioned on a plurality of said shells and located with common longitude and latitude provides an estimate of height and slope data for terrain at said longitude and said latitude.

10. A system according to claim 1 wherein said gradiometer is carried by a vehicle, said system further comprising means for deducting self and centripetal vehicular gravity gradients and normal earth gravity gradients from measured values of gravity gradient to obtain local anomalous gravity gradient of terrain and geology, and wherein said calculating of predicted values of gravity gradient is a calculating of predicted values of anomalous gravity gradient;
wherein said statistical model employs a set of cross covariance terms of terrain and residual geology, the cross covariance terms have the form of shells having surface curvatures in three dimensions and differing in spatial frequency; and
wherein a sum of a set of the shells at the different spatial frequencies represents terrain surface data, each of said shells is represented by a grid having a set of grid points arranged in an array of rows and columns, and said grid has a central point presenting data for the present location of said vehicle to enable said filter means to null said deviation between measured and predicted values of gravity gradient in real time.

11. A system according to claim 10 wherein, in each of said shells of said statistical model, each of said grid points is constituted by three parameters, a first of said parameters being height of the shell at the grid point above a reference surface, a second of said parameters is a slope of the shell at the grid point measured in a north south vertical plane, and a third of said parameters is a slope of the shell at the grid point measured in an east west vertical plane; and
the grid points of a shell of higher spatial frequency are located more closely together than the grid points of a shell of lower spatial frequency, and the summation of the parameters of grid points positioned on a plurality of said shells and located with common longitude and latitude provides an estimate of height and slope data for terrain at said longitude and said latitude.

12. A method of estimating terrain comprising steps of:
providing a map of known or presumed elevation data of a terrain;
operating a gravity gradiometer to obtain measurements of gravity gradient;
generating a statistical model of the terrain and residual geology and, via optimal filtering, obtaining a set of cross covariance terms from the statistical model;
predicting values of gravity gradient from a sum of the cross covariance terms at a location of said gravity gradiometer relative to said terrain;
comparing predicted and measured values of gravity gradient to obtain an innovation of gravity gradient; and
adjusting a terrain estimate of the elevation data to reduce the innovation.

13. A method according to claim 12 further comprising steps of:

transporting said gravity gradiometer by a vehicle past the terrain;

establishing the location of said gradiometer, said location being employed in said optimal filtering;

describing each of said cross covariance terms in terms of a shell having a surface curvature in three dimensions;

providing the shells at differing spatial frequencies; and wherein a sum of a set of the shells at the different spatial frequencies represents terrain surface data.

14. A method according to claim 13 further comprising steps of:

subtracting from said gravity gradient measurements of self and centripetal vehicular gravity gradients and normal earth gradients to obtain local anomalous gravity gradient of terrain and geology; and wherein, in said step of predicting values of gravity gradient from a sum of the cross covariance terms, the predicted values are of anomalous gravity gradient.

15. A method according to claim 14 further comprising steps of representing, in said statistical model, each of said shells by a grid having a set of grid points arranged in an array of rows and columns; and in each of said shells, constituting each of said grid points by three parameters, a first of said parameters being height of the shell at the grid point above a reference surface, a second of said parameters is a slope of the shell at the grid point measured in a north south vertical plane, and a third of said parameters is a slope of the shell at the grid point measured in an east west vertical plane.

16. A method according to claim 15 wherein said step of adjusting terrain estimate is accomplished by adjusting the three parameters of each of said grid points of each of said shells.

17. A system according to claim 1, wherein said system further comprises means for deducting the terrain component of the anomalous gravity gradient, leaving the geological component, the geological component being representative of geological structure.

* * * * *